US011257134B2

(12) United States Patent
Balasubramanian et al.

(10) Patent No.: US 11,257,134 B2
(45) Date of Patent: Feb. 22, 2022

(54) SUPPLIER INVOICE RECONCILIATION AND PAYMENT USING EVENT DRIVEN PLATFORM

(71) Applicant: AMERICAN EXPRESS TRAVEL RELATED SERVICES COMPANY, INC., New York, NY (US)

(72) Inventors: Satishkumar Balasubramanian, Phoenix, AZ (US); Mary Catherine Callahan, Phoenix, AZ (US); Mohnish Gorantla, New York, NY (US); Sachin D. Jadhav, Phoenix, AZ (US); Christine A. Knorr, Parks, AZ (US); Jason Meltzer, Scottsdale, AZ (US); Dorothy Mills, Walnut Creek, CA (US); Amar Petla, New York, NY (US); Anupam Seth, Urbana, IL (US); Rahul Shaurya, Phoenix, AZ (US); Silajit Singh, Scottsdale, AZ (US); Urvashi Tyagi, Short Hills, NJ (US)

(73) Assignee: American Express Travel Related Services, Inc., New York, NY (US)

( * ) Notice: Subject to any disclaimer, the term of this patent is extended or adjusted under 35 U.S.C. 154(b) by 110 days.

(21) Appl. No.: 16/456,203

(22) Filed: Jun. 28, 2019

(65) Prior Publication Data
US 2020/0410562 A1    Dec. 31, 2020

(51) Int. Cl.
*G06Q 30/04* (2012.01)
*G06Q 30/06* (2012.01)
*G06Q 10/08* (2012.01)

(52) U.S. Cl.
CPC .......... *G06Q 30/04* (2013.01); *G06Q 10/087* (2013.01); *G06Q 30/0637* (2013.01)

(58) Field of Classification Search
CPC ... G06Q 30/04; G06Q 10/087; G06Q 30/0637
(Continued)

(56) References Cited

U.S. PATENT DOCUMENTS

| 10,783,572 B2 * | 9/2020 | Seabaugh .......... G06Q 30/0637 |
| 2004/0044951 A1 * | 3/2004 | Repko .................... G06Q 30/06 |
| | | 715/224 |

(Continued)

FOREIGN PATENT DOCUMENTS

| JP | 2011510399 | 3/2011 |
| WO | 2018195358 | 10/2018 |

OTHER PUBLICATIONS

International Search Report in PCT/US2020/037715 dated Oct. 8, 2020.

*Primary Examiner* — Vanel Frenel
(74) *Attorney, Agent, or Firm* — Thomas | Horstemeyer LLP

(57) ABSTRACT

A system for automated supplier invoice reconciliation is disclosed. The system may receive an order confirmation associated with a purchase order (PO) from a supplier system. The system may receive the PO associated with the order confirmation from a buyer system. The system may receive a first invoice associated with the PO and the order confirmation from the supplier system. The system may reconcile between the PO, the first invoice, and the order confirmation to generate a second invoice. The system may pass the second invoice to the buyer system.

20 Claims, 6 Drawing Sheets

(58) Field of Classification Search
USPC .......................................................... 705/34
See application file for complete search history.

(56) References Cited

U.S. PATENT DOCUMENTS

| | | | |
|---|---|---|---|
| 2008/0133388 A1* | 6/2008 | Alekseev | ............... G06Q 30/06 |
| | | | 705/34 |
| 2009/0132414 A1* | 5/2009 | Philliou | ............... G06Q 20/102 |
| | | | 705/40 |
| 2010/0125521 A1 | 5/2010 | Hanan et al. | |
| 2013/0246245 A1* | 9/2013 | Sun | ........................ G06Q 10/08 |
| | | | 705/37 |
| 2014/0258047 A1 | 9/2014 | Livesay et al. | |
| 2015/0248714 A1* | 9/2015 | Slocum | .................. G06Q 30/04 |
| | | | 705/34 |

* cited by examiner

SUPPLIER INVOICE RECONCILIATION AND PAYMENT USING EVENT DRIVEN PLATFORM

FIELD

The present disclosure generally relates to systems and methods for automated invoice reconciliation and payment.

BACKGROUND

Traditional methods of invoice reconciliation often rely on a sequence of purchase orders and invoices prior to payment flowing between the buyer to the supplier. A technical problem exists in that payment throughput is limited by the efficiency of transmitting the purchase orders, the number of purchase orders and the number of invoices between buyers, suppliers, and payors. Furthermore, errors may be introduced due to the mostly manual nature of the reconciliation process between systems. In this regard, supplier invoice analysis and reconciliation by traditional manual methods is usually time consuming, demands a relatively large number of user inputs, and may be intolerant of informational faults.

SUMMARY

In various embodiments, systems, methods, and articles of manufacture (collectively, the "system") for automated supplier invoice reconciliation is disclosed. The system may receive an order confirmation associated with a purchase order (PO) from a supplier system. The system may receive the PO associated with the order confirmation from a buyer system. The system may receive a first invoice associated with the PO and the order confirmation from the supplier system. The system may reconcile between the PO, the first invoice, and the order confirmation. The system may generate a second invoice in response to the reconciling. The system may pass the second invoice to the buyer system.

In various embodiments, the system may consume an order confirmation message and record the order confirmation to an order confirmation table. The system may post the order confirmation message to an order confirmation API of the buyer system and receive a buyer order confirmation response message. The system may update a status of the order confirmation based on the buyer order confirmation response message. The system may resend the order confirmation message to the order confirmation API in response to an error.

In various embodiments, the system may compare the first invoice against a plurality of invoices in a first invoice table to determine a new invoice. The system may write the first invoice to the invoice table in response determining the new invoice. The system may fetch or receive the PO and the order confirmation. The system may match the invoice, the PO, and the order confirmation. In various embodiments, the system may read a plurality of line items from each of the first invoice, the PO, and the order confirmation. The system may determine a matched line item set comprising a same set of line items across each of the first invoice, the PO, and the order confirmation based on a common attribute. The system may calculate a running total for the matched line item set based on an item price and an item quantity.

In various embodiments, the system may fetch the first invoice from the first invoice table. The system may generate the second invoice based on the PO, the first invoice, and the running total. The system may pass the second invoice to an electronic invoicing API of the buyer system and may receive a reply. The system may update a status of the second invoice recorded in a second invoice table based on the reply. In various embodiments, the system may generate a generate payment instruction file (PIF) message. The system may generate an JSON PIF based on the first invoice and the PO in response to the generated PIF message. The system may pass the JSON PIF to a payment API of the system and may receive a payment confirmation ID in response. The system may associate at least one of the payment confirmation ID or the JSON PIF with the second invoice.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The system provides a greater level of sophistication and control for a supplier invoice reconciliation process. Benefits of the present disclosure may apply to any suitable use of invoicing systems and purchase order systems. For example, the present disclosure may apply in consumer sales contexts, B2B, or logistics contexts. While this disclosure may refer to a "supplier invoice", one skilled in the art will appreciate that the system may apply to any type of invoice, bill, charge or request.

As discussed above, while prior art systems typically include the technical problem of time delayed payments and reconciliation between buyers and suppliers, the current system provides a technical solution by reconciling payments at the event platform. In this regard, the system may increase the speed and efficiency of payment processing by automated reconciliation by an event platform. The system may reduce the process time a payment process is engaged by a user. For example, a payment process may be reduced from a period of months or weeks to a period of days. The system may also reduce redundant PO confirmation requests and invoices, thereby reducing a demand for system resources. The system may simplify message sorting, routing, and reconciliation processing and enhance user experience by decreasing a number of user interactions.

This process improves the functioning of the computer. For example, the process increases the reliability and speed of supplier reconciliation by reducing a number of user inputs and/or bypassing a number of user input requests to reconcile POs, invoices, PO confirmations and generate payments. Similarly, the process increases the reliability and speed of data presentation by enabling automated reconciliation and invoice payment. The system may tend to increase reliability by passing information to a system where POs, invoices, and/or PO confirmations are reconciled. In this regard, system resources are not burdened by data which may be invalid, duplicate, or pending thereby tending to reduce kick-outs manual interventions, and/or the like. In various embodiments, the processes described herein may increase network availability by reducing front end and back end process calls and/or network hops. The processes may also save processing resources including CPU time, memory resources, and network resources. For example, traditional systems may tend to configure a separate punchout catalog for each legal entity, ERP, and/or market in order to capture and reconcile POs, invoices, PO confirmations and or the like. In this regard, traditional systems and tend to increase demand for processing and data resources. The processes and systems disclosed herein tend to enable a single punchout by market which may automatically reconcile POs, invoices, PO confirmations and the like.

Figure 1:
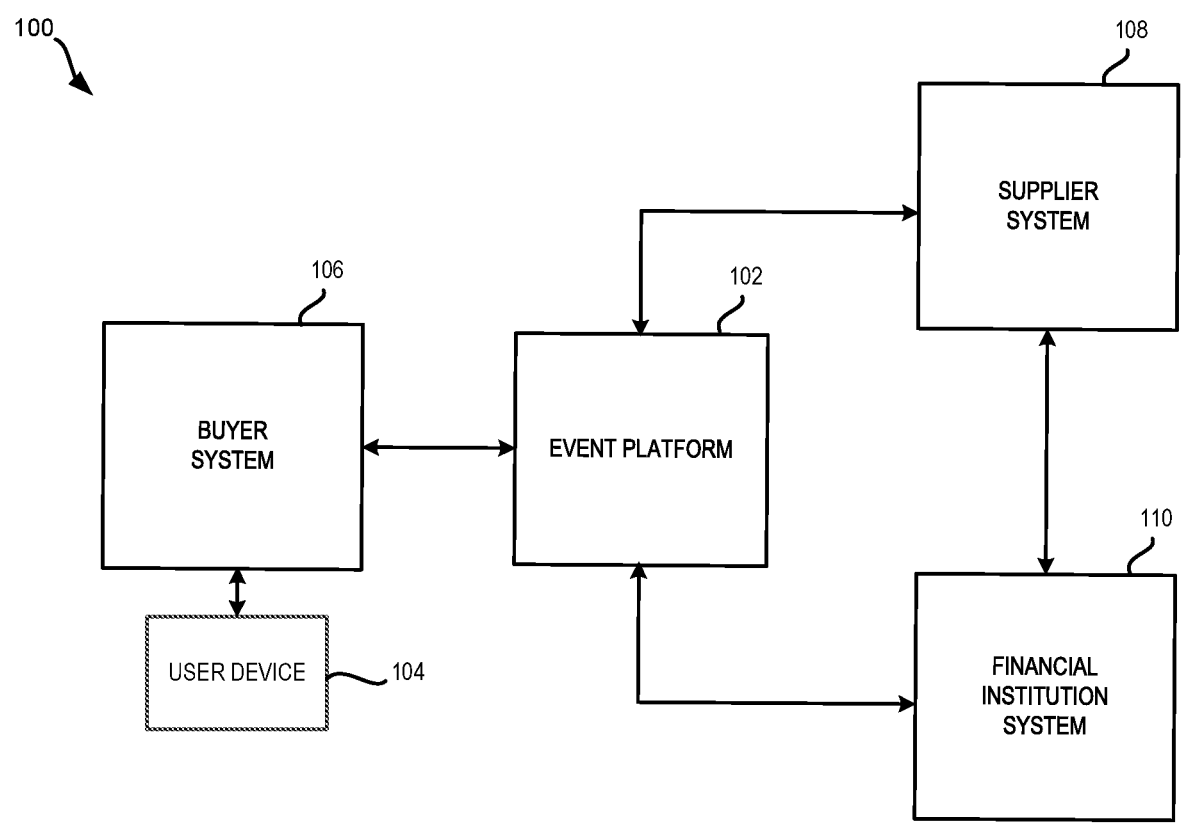
FIG. 1 is a block diagram illustrating various system components of a system for supplier invoice reconciliation, in accordance with various embodiments.

In various embodiments, and with reference to FIG. 1, a system 100 for supplier invoice reconciliation and payment may comprise an event platform 102, a user device 104, a buyer system 106, a supplier system 108, and a financial institution system 110. Any of these components may be outsourced and/or be in communication with event platform 102 via a network. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. In various embodiments, event platform 102 may be configured as a central network element or hub to access various systems, engines, and components of system 100.

System 100 may comprise an event driven architecture also known as a message-drive architecture which is an architecture pattern promoting the production, detection, consumption, and reaction to events. An event may be defined as a significant change in state. The event driven architecture may comprise event generators, event consumers, and event channels. An event generator may publish events in the form of messages and may be unaware of consumption events. An event consumer subscribes to published events and may be oblivious to other event consumers. Event consumers may handle events in an asynchronous manner. An event channel may handle subscriptions, storage, and delivery of events.

In various embodiments, the event driven architecture may be a Kafka architecture including a consumer group comprising a plurality of event consumers and a producer group comprising a plurality of event generators. The Kafka architecture includes a Kafka cluster comprising a plurality of event brokers and a zookeeper. The event brokers may pass messages pushed from the producer group in response to pulls from the consumer group. The zookeeper may maintain event consumer group offsets, topic lists, leader elections, and general state information. The Kafka cluster and/or event brokers may define a plurality of event topics and the event generators may publish event messages to the event topics.

In various embodiments, event platform 102 may comprise a network, computer-based system, and/or software components configured to provide an access point across the buyer system 106 the supplier system 108 and the financial institution system 110 to various systems, engines, and components of system 100. Buyer system 106 may be in operative and/or electronic communication with the user device 104 and the event platform 102. In this regard, the event platform 102 may allow communication from user device 104 to systems, engines, and components of system 100. In various embodiments, any of the event platform 102 may include one or more data centers, cloud storages, or the like, and may include software, such as APIs, configured to retrieve and write data to the various systems, engines, and elements of system 100.

In various embodiments, user device 104 may comprise software and/or hardware in communication with buyer system 106 via a network comprising hardware and/or software configured to allow a transaction account owner, a user, and/or the like, access to mail event platform 102 and/or supplier system 108. User device 104 may comprise any suitable device that is configured to allow a user to communicate with a network and elements of system 100. User device 104 may include, for example, a personal computer, personal digital assistant, cellular phone, kiosk, and/or the like and may allow a user to transmit voice communications and/or electronic messages.

In various embodiments, buyer system 106 may enable a buyer to interact with system 100 to submit a purchase order request (i.e., a PO), view supplier quotes and financing products, complete purchases, and/or the like. Buyer system 106 may comprise any suitable combination of hardware, software, and/or database components. For example, buyer system 106 may comprise at least one computing device in the form of a computer or processor, or a set of computers/processors, although other types of computing units or systems may be used, such as, for example, a server, web server, pooled servers, or the like. Buyer system 106 may also include one or more data centers, cloud storages, or the like, and may include software, such as APIs, configured to retrieve and write data to the event platform 102. In various embodiments, buyer system 106 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

Although the present disclosure makes reference to buyer system 106, it should be understood that principles of the present disclosure may be applied to a supplier invoice reconciliation and payment system having any suitable number of supplier systems interconnected to event platform 102.

In various embodiments, supplier system 108 may enable a seller to interact with system 100 to retrieve and view purchase order requests, submit quotes, complete buyer orders, and/or the like. Supplier system 108 may comprise any suitable combination of hardware, software, and/or database components. For example, supplier system 108 may comprise at least one computing device in the form of a computer or processor, or a set of computers/processors, although other types of computing units or systems may be used, such as, for example, a server, web server, pooled servers, or the like. Supplier system 108 may also include one or more data centers, cloud storages, or the like, and may include software, such as APIs, configured to retrieve and write data to the blockchain. In various embodiments, supplier system 108 may include one or more processors and/or one or more tangible, non-transitory memories and may be capable of implementing logic. The processor may be configured to implement various logical operations in response to execution of instructions, for example, instructions stored on a non-transitory, tangible, computer-readable medium, as discussed further herein. Supplier system 108 may also comprise any suitable number of back-end systems to provide item inventory, transaction processing, item shipment and/or delivery, and/or the like.

Although the present disclosure makes reference to supplier system 108, it should be understood that principles of the present disclosure may be applied to a supplier invoice reconciliation and payment system having any suitable number of supplier systems interconnected to event platform 102.

In various embodiments, financial institution system 110 may interact with system 100 to retrieve and view POs, payment authorizations, invoices, supplier quotes and/or the like, submit financing products, transmit payments to complete buyer orders, and/or the like. Financial institution system 110 may comprise any suitable combination of hardware, software, and/or database components. For example, may comprise one or more network environments, servers, computer-based systems, processors, databases, and/or the like. Financial institution system 110 may comprise at least one computing device in the form of a computer or processor, or a set of computers/processors, although other types of computing units or systems may be used, such as, for example, a server, web server, pooled servers, or the like. Financial institution system 110 may also include one or more data centers, cloud storages, or the like, and may include software, such as APIs, configured to retrieve and write data to the event platform 102. In various embodiments, financial institution system 110 may include one or more processors and/or one or more tangible, non-transitory memories and may be capable of implementing logic. The processor may be configured to implement various logical operations in response to execution of instructions, for example, instructions stored on a non-transitory, tangible, computer-readable medium, as discussed further herein.

In various embodiments, financial institution system 110 may comprise or interact with event platform 102 to facilitate purchases and payments, authorize transactions, and/or settle transactions. For example, financial institution system 110 may represent existing proprietary networks that presently accommodate transactions for credit cards, debit cards, and/or other types of transaction accounts or transaction instruments. Financial institution system 110 may be a closed network that is secure from eavesdroppers. In various embodiments, financial institution system 110 may comprise an exemplary transaction network such as AMERICAN EXPRESS®, VISANET®, MASTERCARD®, DISCOVER®, INTERAC®, Cartes Bancaires, JCB®, private networks (e.g., department store networks), and/or any other payment network. Financial institution system 110 may include systems and databases related to financial and/or transactional systems and processes, such as, for example, one or more authorization engines, authentication engines and databases, settlement engines and databases, accounts receivable systems and databases, accounts payable systems and databases, and/or the like. For example, financial institution system 110 may authorize and settle payment transactions, and maintain transaction account member databases, accounts receivable databases, accounts payable databases, or the like. In various embodiments, the financial institution system 110 may include an issuer system, an acquirer system, a payments processor, and/or the like.

Although the present disclosure makes reference to financial institution system 110, it should be understood that principles of the present disclosure may be applied to a supplier invoice reconciliation and payment system having any suitable number of supplier systems interconnected to event platform 102.

Figure 2:
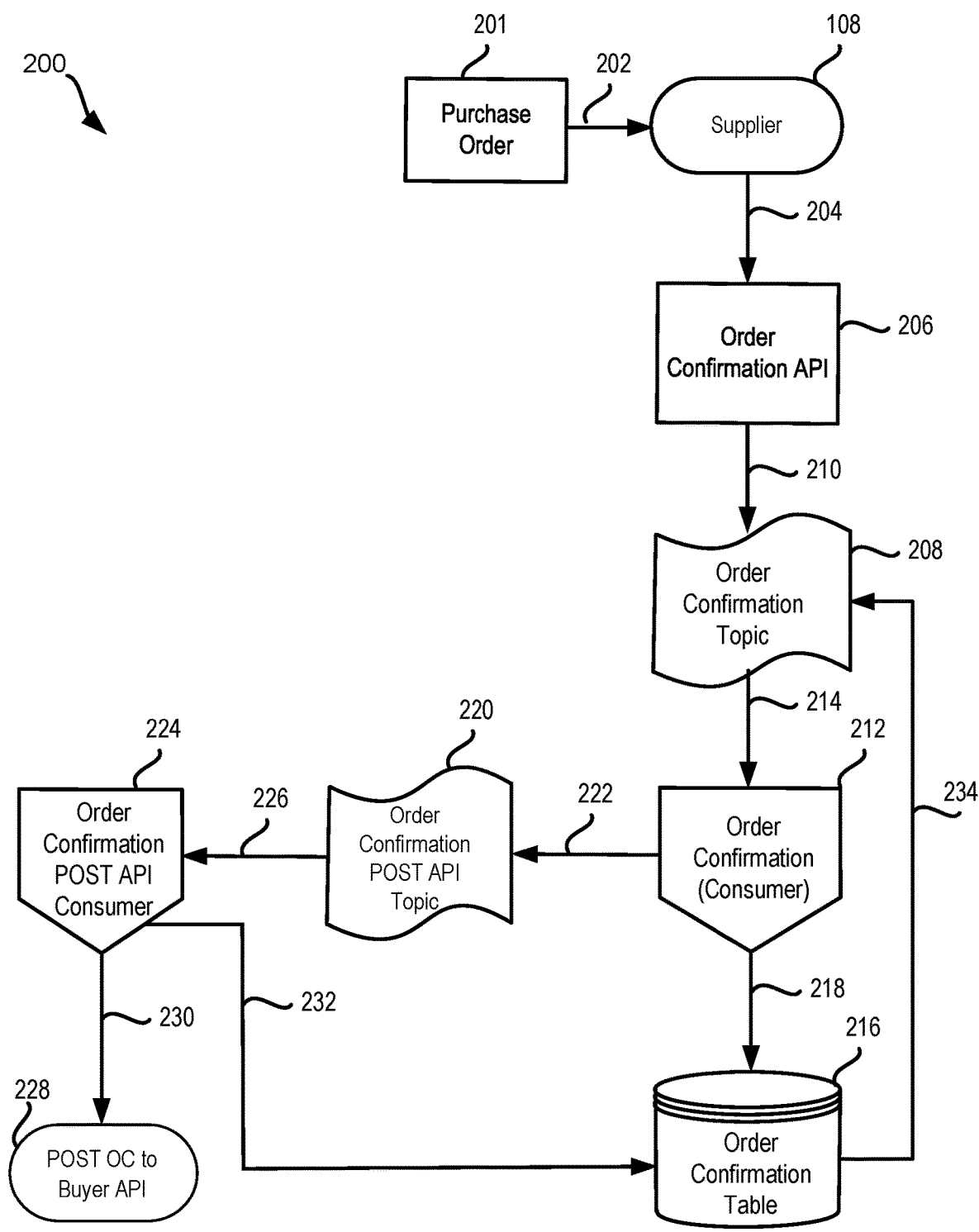
FIG. 2 illustrates a process for order confirmation in a system for supplier invoice reconciliation, in accordance with various embodiments.

With reference to FIG. 2, a process 200 (e.g., in system 100) for order confirmation in a system for supplier invoice reconciliation and payment is illustrated. Buyer system 106 may generate a Purchase Order (PO) 201 and pass the PO 201 to the supplier system 108 (step 202). Step 202 includes displaying a supplier catalog on user device 104 via a buyer catalog punchout. Step 202 includes building the PO 201 via the buyer catalog punchout. For example, building the PO may comprise selecting a plurality of stock numbers from the buyer catalog punchout. In various embodiments, buyer system 106 may pass the PO 201 to the supplier system 108 via the commerce extensible markup language (cXML) protocol. It will be appreciated by those skilled in the art that any suitable protocol may be employed to pass data files between the various modules of system 100. In response to receiving the PO 201, the supplier system 108 may post a cXML PO confirmation to an order confirmation API 206 of event platform 102 (step 204). In various embodiments the cXML PO confirmation message may comprise the PO 201 or may be associated with the PO 201. For example, the cXML PO confirmation message may be associated with the PO 201 via a PO number. In response to receiving the cXML PO confirmation message, the order confirmation API 206 may post the cXML PO confirmation message to an order confirmation topic 208 of a Kafka architecture (step 210).

An order confirmation consumer 212 may consume the cXML PO confirmation message from the order confirmation topic 208 (step 214). In response to consuming the cXML PO confirmation message, the order confirmation consumer 212 records an order confirmation to order confirmation table 216 (step 218). In various embodiments, event platform 102 may be configured to pass the order confirmation to buyer system 106. The order confirmation consumer 212 may post an order confirmation message to an order confirmation post topic 220 (step 222). An order confirmation post API consumer 224 may read the order confirmation message from the order confirmation post topic 220 (step 226). The order confirmation post API consumer 224 may post the order confirmation message to an order confirmation API 228 of the buyer system 106 (step 230). The order confirmation post API consumer 224 may receive a buyer order confirmation response message from the order confirmation API 228 and, in response, may update the status of the order confirmation recorded in order confirmation table 216 (step 232). For example, step 232 may include setting an order confirmation received flag for the order confirmation. Process 200 includes determining whether the order confirmation has been successfully posted to the order confirmation API 228 of the buyer system 106 and, if not successfully posted, posting the order confirmation to the order confirmation topic 208 (step 234). In this regard the process may recycle at step 214 tending thereby to resend the order confirmation to the buyer system 106 and ensure receipt of the order confirmation. For example, the system may resend the XML PO confirmation message to the order confirmation API 228 in response to buyer order confirmation response message indicating an error.

Figure 3:
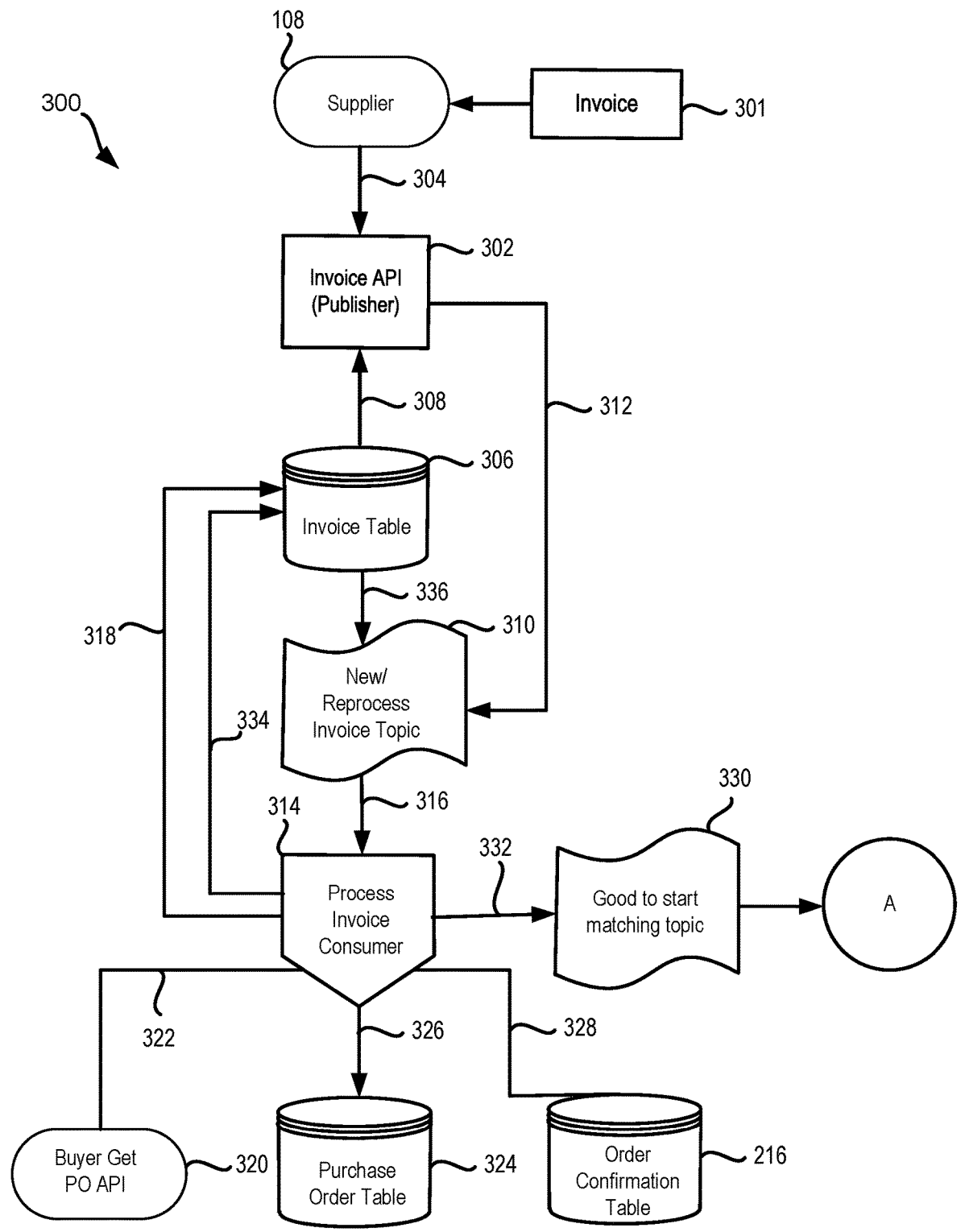
FIG. 3 illustrates a method for invoice processing in a system for supplier invoice reconciliation, in accordance with various embodiments.

In various embodiments and with additional reference to FIG. 3, a process 300 for invoice processing in a system for supplier invoice reconciliation and payment is illustrated. In response to receiving the PO 201, supplier system 108 may generate an invoice 301 (i.e. a first invoice) in the cXML protocol. In response to generating the invoice 301, the supplier system 108 may post a cXML invoice message comprising the invoice 301 to an invoice API 302 of event platform 102 (step 304). The invoice API 302 may check if the invoice 301 is a duplicate invoice by comparing the invoice 301 with invoices stored in an invoice table 306 (step 308). The invoice API 302 posts the cXML invoice message to a new/reprocess invoice topic 310 in response to determining the invoice is not a duplicate invoice (step 312). A process invoice consumer 314 consumes the cXML invoice message from the new/reprocess invoice topic 310 to receive the invoice 301 (step 316). In response to consuming the cXML invoice message, the process invoice consumer 314 writes the invoice 301 to the invoice table 306 (step 318). Stated another way, the system may determine the invoice 301 is a new invoice and, in response, write the invoice 301 to the invoice table 306. In various embodiments, the event platform 102 may be configured to fetch the purchase order 201 from the buyer system 106. The process invoice consumer 314 may call a get PO API 320 of buyer system 106 and may receive the PO 201 in response (step 322). The get PO API 320 may return a cXML or XML PO. The process invoice consumer 314 may write the PO 201 to purchase order table 324 in response to receiving the PO 201 (step 326).

The process invoice consumer 314 may validate the invoice 301 is associated with the PO 201 and/or the order confirmation (step 328). Step 328 may include, for example, reading the order confirmation table 216 and matching the invoice 301 with an order confirmation based on the PO number and an invoice number. Step 328 may include matching the PO 201 with the invoice 301 based on the PO number and the invoice number. Step 328 may include determining an invoice valid where the PO number, the invoice number, and the order confirmation number are matched. The PO number and relevant extrinsic fields correspond across the PO, the order confirmation and the invoice. In this regard and across all documents, the PO number may match. Accordingly, the system may validate the invoice 301 by association with the PO 201 and an order confirmation. The process invoice consumer 314 may post a good to start matching message associated with the invoice 301 a good to start matching topic 330 in response to determining invoice 301 a valid invoice (step 332). In various embodiments, the process invoice consumer 314 may generate an error message and update the invoice table 306 in response (step 334). Step 334 may include for example, flagging invoice 301 as invalid where any of the PO number, the invoice number, and the order confirmation number are unmatched. In various embodiments, the system may periodically and/or asynchronously republish the invoice message comprising the invoice to the new/reprocess invoice topic 310 where the invoice has not been inserted into the invoice table 306 or validated by association with the PO (step 336).

Figure 4:
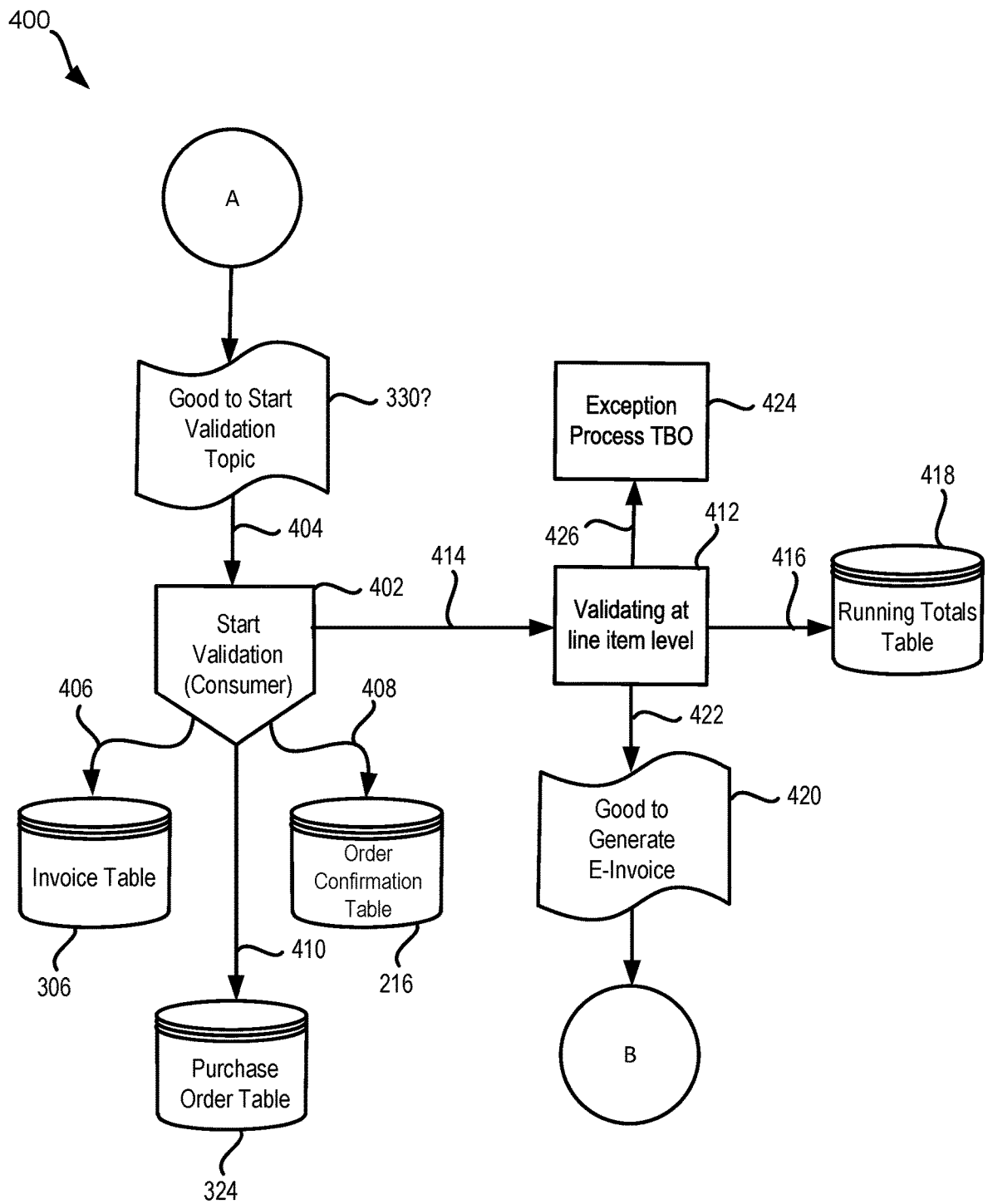
FIG. 4 illustrates a process for invoice matching in a system for supplier invoice reconciliation, in accordance with various embodiments.

In various embodiments and with additional reference to FIG. 4, a process 400 for invoice matching in a system for supplier invoice reconciliation and payment is illustrated. A start matching consumer 402 is subscribed to the good to start matching topic 330 and consumes the good to start matching message associated with the invoice 301 to trigger a matching process (step 404). The start matching consumer 402 fetches the invoice 301 from invoice table 306 (step 406). The start matching consumer 402 fetches the associated order confirmation from order confirmation table 216 (step 408). The start matching consumer 402 fetches the associated PO 201 from the purchase order table 324 (step 410). In various embodiments, each of the PO 201, the invoice 301, and the order confirmation may comprise structured data such as XML or cXML including line items associated with purchase. Each line item may include various attributes associated with the item such as, for example, an item number, an item price, an item quantity, and/or the like. In various embodiments, line items may be associated with the purchase, for example, by a stock number, a Stock Keeping Unit (SKU), the item number, and/or the like. The start matching consumer 402 may pass each of the PO 201, the invoice 301, and the order confirmation to a matching module 412 of event platform 102.

A matching module 412 of event platform 102 may determine a matched line item set comprising a same set of line items across each of the PO 201, the invoice 301, and the order confirmation (step 414). Step 414 may include matching module 412 comparing each of the line items of the PO 201, the invoice 301, and the order confirmation to determine, with respect to each line item, a match across the line items of the respective PO 201, invoice 301, and order confirmation. For example, the PO 201 may comprise a first line item associated with a first quantity and a first price. In various embodiments, the matching module 412 may align and/or match the line items each of the PO 201, invoice 301, and order confirmation line items based on a common attribute such as one of the SKU, the item number, and/or the stock number. Step 414 may include the matching module 412 searching the plurality of line items of each of the invoice 301 and order confirmation to verify each of the invoice 301 and the order confirmation comprise a line item having the first quantity and the first price. Step 414 may include comparing each of the attributes of the each of the matched line items to verify each of the PO 201, the invoice 301, and the order confirmation comprise the same set of line items and associated attributes. In this regard, the system may reconcile between the PO 201, the invoice 301, and the order confirmation associated with the PO 201. In various embodiments, the matching module 412 may calculate credits (e.g., negative payments). For example, matching module 412 may handle sign conversion (positive to negative or vice versa) of an invoice and/or a payment instruction and thereby process both payments and credits. In various embodiments, the payments or credits may be calculated based on an invoice type lookup code included with the invoice.

For each matched line item, the system may calculate a running total for the matched line item based on the item price and the item quantity (step 416). In various embodiments, there may be a many-to-one relationship between invoices and a PO and/or order confirmation. In this regard, a running total may be calculated by matching line items across a plurality of invoices. Step 416 includes inserting the running total for each matched line item into a running totals table 418. The matching module 412 publishes a good to generate electronic invoice message to the good to generate invoice topic 420 in response to generating the matched line item set comprising the same set of line items across each of the PO 201, the invoice 301, and the order confirmation (step 422). The matching module 412 may call an exception process 424 when a mismatch between any of the line items of the PO 201, the invoice 301, and the order confirmation is determined (step 426).

Figure 5:
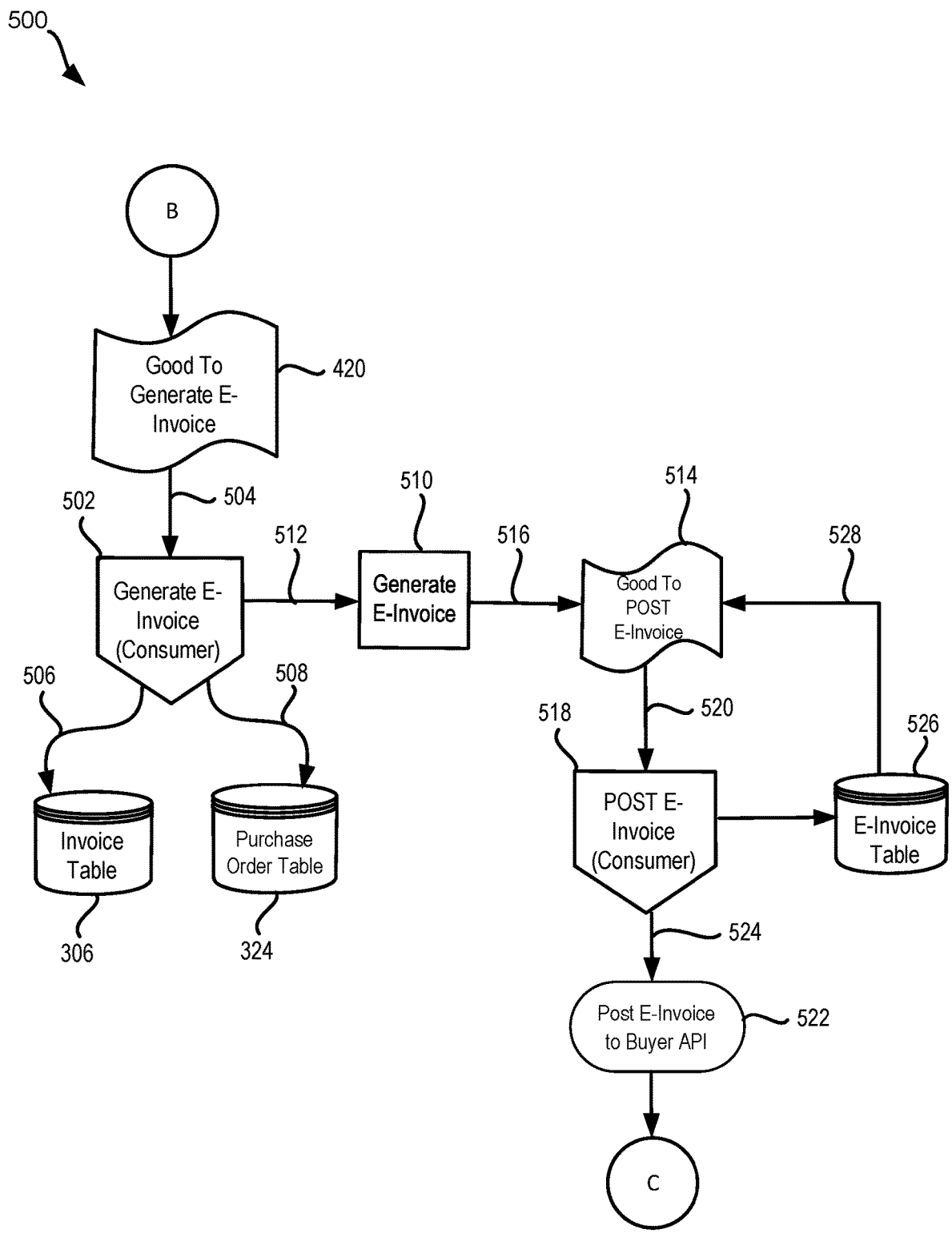
FIG. 5 illustrates an invoice generation process in a system for supplier invoice reconciliation, in accordance with various embodiments.

In various embodiments, and with additional reference to FIG. 5, a process 500 for invoice generation in a system for supplier invoice reconciliation and payment is illustrated. A generate electronic invoice consumer 502 is subscribed to the good to generate invoice topic 420 and consumes the good to generate electronic invoice message to trigger an invoice generation process (step 504). The generate electronic invoice consumer 502 fetches the invoice 301 from invoice table 306 (step 506). The generate electronic invoice consumer 502 fetches the associated PO 201 from purchase order table 324 (step 508). The generate electronic invoice consumer 502 may pass the PO 201 and the invoice 301 to an invoice generation module 510 of event platform 102. The invoice generation module 510 may generate a second invoice based on the PO 201 and the invoice 301 (step 512). Step 512 may include reading the running totals table 418 and generating the second invoice based on the PO 201, the invoice 301, and the running total. The invoice generation module 510 may send a good to post invoice message to a good to post invoice topic 514 in response to generating the second invoice (step 516).

A post electronic invoice consumer 518 is subscribed to the good to post invoice topic 514 and consumes the good to post invoice message to recover the second invoice (step 520). The post electronic invoice consumer 518 may pass the second invoice to an electronic invoicing API 522 of the buyer system 106 (step 524). The post electronic invoice consumer 518 may receive a reply from the electronic invoicing API 522 and, in response, may update the status of the second invoice recorded in an electronic invoice table 526 (step 232). Step 232 may include recording the second invoice in the electronic invoice table 526. In various embodiments, the reply from the electronic invoicing API 522 may indicate a failure to pass the second invoice and the system may resend the good to post invoice message to the good to post invoice topic 514 (step 528). In this regard the process 500 may recycle at step 520 tending thereby to resend the second invoice to the buyer system 106 and ensure receipt of the second invoice.

Figure 6:
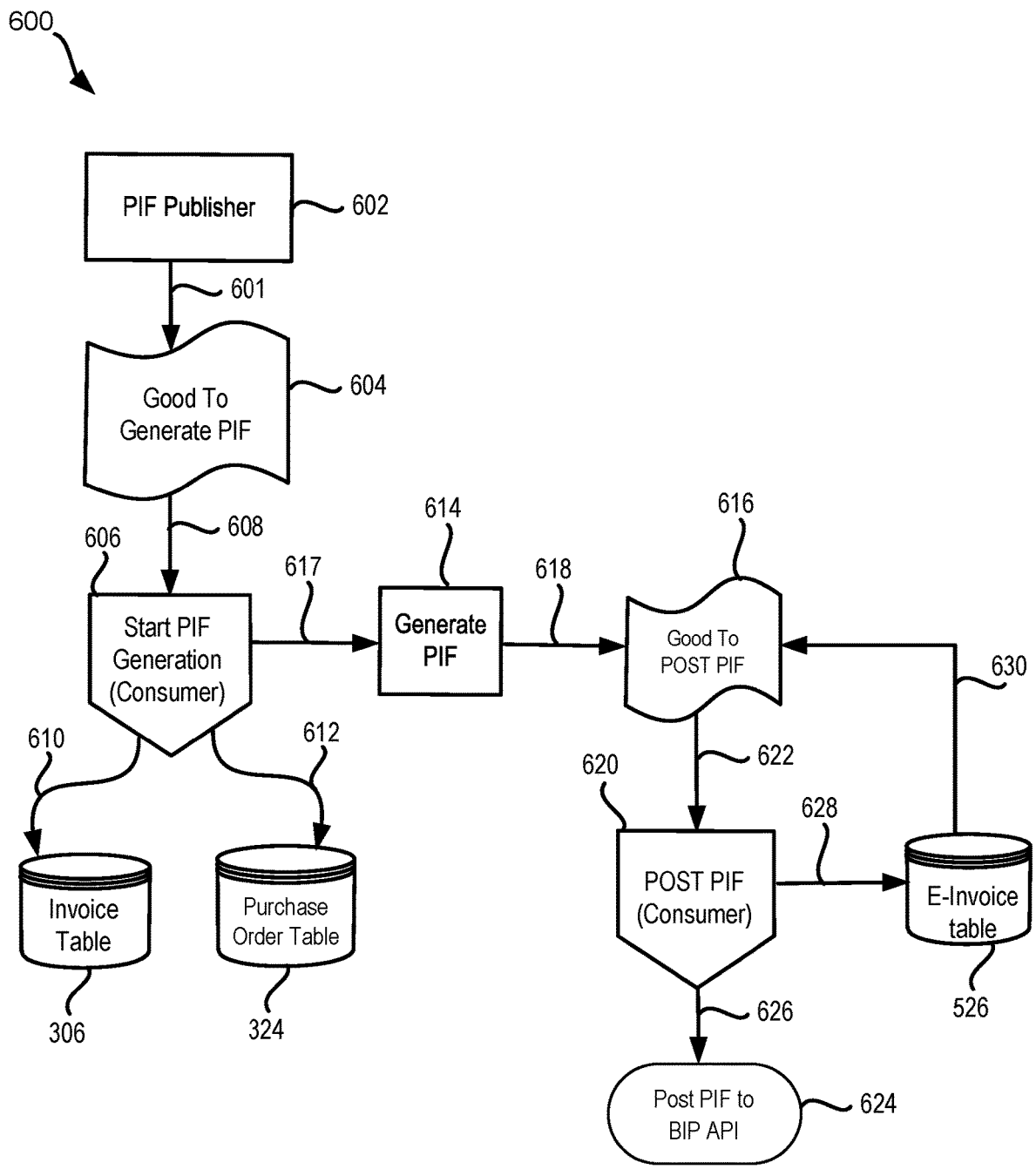
FIG. 6 illustrates a process for payment information file generation in a system for supplier invoice reconciliation, in accordance with various embodiments.

In various embodiments and with additional reference to FIG. 6, a process 600 for payment instruction file (PIF) generation in a system for supplier invoice reconciliation and payment is illustrated. An asynchronous PIF publisher 602 may periodically generate a generate PIF message and post the generate PIF message to a good to generate PIF topic 604 (step 601). A start PIF generation consumer 606 is subscribed to the good to generate PIF topic 604 and consumes the good to generate a PIF message to trigger a PIF generation process (step 608). The PIF generation consumer 606 fetches the invoice 301 from invoice table 306 (step 610). The PIF generation consumer 606 fetches the associated PO 201 from purchase order table 324 (step 612). The PIF generation consumer 606 may pass the PO 201 and the invoice 301 to a PIF generation module 614 of event platform 102. The PIF generation module 614 generates a JSON PIF message comprising a PIF based on the PO 201 and the invoice 301 (step 617). The PIF generation module 614 sends the JSON PIF message to a good to post PIF topic 616 (step 618).

A post PIF consumer 620 is subscribed to the good to post PIF topic 616 and consumes the JSON PIF message to trigger a PIF posting process (step 622). The post PIF consumer 620 may call a payment API 624 of the system 100 (for example, buyer system 106, financial institution system 110, or, event platform 102) and receiving a payment confirmation ID (step 626). Step 626 may include passing the PIF to the event platform 102 via the payment API 624 and receiving a reply comprising the payment confirmation ID in response. The post PIF consumer 620 updates the status of the PIF recorded in the electronic invoice table 526 (step 628). Step 628 may include recoding the PIF and the payment confirmation ID in the electronic invoice table 526 and associating the PIF and the payment confirmation ID with the second invoice. In various embodiments, the reply from the payment API 624 may indicate a failure to pass the PIF and the system may resend the JSON PIF message to the good to post PIF topic 616 (step 630). In this regard the process 600 may recycle at step 622 tending thereby to resend the PIF and ensure receipt of the PIF and the payment confirmation ID. In various embodiments, the event platform 102 may pass the payment confirmation ID to the financial institution system 110.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like, Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, N.Y.) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The computer system may also include a communications interface. A communications interface allows software and data to be transferred between the computer system and external devices. Examples of communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI' software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

Phrases similar to a "payment processor" may include a company (e.g., a third party) appointed (e.g., by a merchant) to handle transactions. A payment processor may include an issuer, acquirer, authorizer, and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

What is claimed is:

1. A method, comprising:
   receiving, by a computer based system, an order confirmation, associated with a purchase order (PO), from a supplier system;
   receiving, by the computer based system, the PO associated with the order confirmation from a buyer system;
   receiving, by the computer based system, a first invoice and a second invoice associated with the PO and the order confirmation from the supplier system;
   reconciling, by the computer based system, between the PO, the first invoice, the second invoice, and the order confirmation, wherein the reconciliation comprises:
      determining a matched line item set comprising a same set of line items across each of the first invoice, the second invoice, the PO, and the order confirmation based at least in part on a common attribute; and
      determining a running total for the matched line item set based at least in part on an item price and an item quantity, wherein the running total for the matched line item set is determined across the first invoice and the second invoice based at least in part on adding a plurality of item invoice quantities for the first invoice and the second invoice and a purchase order item quantity;
   generating, by the computer based system, a third invoice in response to the reconciling, wherein the third invoice is generated based at least in part on the running total for the matched line item set; and
   passing, by the computer based system, the third invoice to the buyer system.

2. The method of claim 1, further comprising:
   consuming, by the computer based system, an order confirmation message and recording the order confirmation to an order confirmation table;
   posting, by the computer based system, the order confirmation message to an order confirmation API of the buyer system and receiving a buyer order confirmation response message;
   updating, by the computer based system, a status of the order confirmation based at least in part on the buyer order confirmation response message; and
   resending, by the computer based system, the order confirmation message to the order confirmation API in response to an error.

3. The method of claim 2, further comprising:
   comparing, by the computer based system, the first invoice against a plurality of invoices in a first invoice table to determine a new invoice;
   writing, by the computer based system, the first invoice to the first invoice table in response to determining the new invoice; and
   fetching, by the computer based system, the PO and the order confirmation; and matching, by the computer based system, the first invoice, the PO, and the order confirmation.

4. The method of claim 3, further comprising:
   fetching, by the computer based system, the first invoice from the first invoice table;
   generating, by the computer based system, the third invoice based at least in part on the PO, the first invoice, and the running total;
   passing, by the computer based system, the third invoice to an electronic invoicing API of the buyer system and receiving a reply; and
   updating, by the computer based system, a status of the third invoice recorded in a second invoice table based at least in part on the reply.

5. The method of claim 4, further comprising:
   generating, by the computer based system, a generate payment instruction file (PIF) message;
   generating, by the computer based system, a PIF based at least in part on the first invoice and the PO in response to the generate PIF message;
   passing, by the computer based system, the PIF to a payment API and receiving a payment confirmation ID in response; and
   associating, by the computer based system, at least one of the payment confirmation ID or the PIF with the second invoice.

6. A system comprising:
   a processor; and
   a tangible, non-transitory memory configured to communicate with the processor, the tangible, non-transitory memory having instructions stored thereon that, in response to execution by the processor, cause the processor to perform operations comprising:
   receiving, by the processor, an order confirmation, associated with a purchase order (PO), from a supplier system;
   receiving, by the processor, the PO associated with the order confirmation from a buyer system;
   receiving, by the processor, a first invoice and a second invoice associated with the PO and the order confirmation from the supplier system;
   reconciling, by the processor, between the PO, the first invoice, and the order confirmation, wherein the reconciliation comprises:
      determining a matched line item set comprising a same set of line items across each of the first invoice, the second invoice, the PO, and the order confirmation based at least in part on a common attribute; and
      determining a running total for the matched line item set based at least in part on an item price and an item quantity, wherein the running total for the matched line item set is determined across the first invoice and the second invoice based at least in part on adding a plurality of item invoice quantities for the first invoice and the second invoice and a purchase order item quantity; and generating, by the processor, a third invoice in response to the reconciling; and passing, by the processor, the second invoice to the buyer system, wherein the third invoice is generated based at least in part on the running total for the matched line item set.

7. The system of claim 6, further comprising:
consuming, by the processor, an order confirmation message and recording the order confirmation to an order confirmation table;
posting, by the processor, the order confirmation message to an order confirmation API of the buyer system and receiving a buyer order confirmation response message;
updating, by the processor, a status of the order confirmation based at least in part on the buyer order confirmation response message; and
resending, by the processor, the order confirmation message to the order confirmation API in response to an error.

8. The system of claim 7, further comprising:
comparing, by the processor, the first invoice against a plurality of invoices in a first invoice table to determine a new invoice;
writing, by the processor, the first invoice to the first invoice table in response to determining the new invoice; and
fetching, by the processor, the PO and the order confirmation; and
matching, by the processor, the first invoice, the PO, and the order confirmation.

9. The system of claim 8, further comprising:
fetching, by the processor, the first invoice from the first invoice table;
generating, by the processor, the third invoice based at least in part on the PO, the first invoice, and the running total;
passing, by the processor, the third invoice to an electronic invoicing API of the buyer system and receiving a reply; and
updating, by the processor, a status of the third invoice recorded in a second invoice table based at least in part on the reply.

10. The system of claim 6, further comprising a kafka architecture.

11. The system of claim 6, wherein the reconciliation further comprises:
reading a plurality of line items from each of the first invoice, the PO, and the order confirmation.

12. The system of claim 11, further comprising:
generating, by the processor, a generate payment instruction file (PIF) message;
generating, by the processor, a PIF based at least in part on the first invoice and the PO in response to the generate PIF message;
passing, by the processor, the PIF to a payment API and receiving a payment confirmation ID in response; and
associating, by the processor, at least one of the payment confirmation ID or the PIF with the second invoice.

13. An article of manufacture including a non-transitory, tangible computer readable storage medium having instructions stored thereon that, in response to execution by a computer based system, cause the computer based system to perform operations comprising:
receiving, by the computer based system, an order confirmation associated with a purchase order (PO) from a supplier system;
receiving, by the computer based system, the PO associated with the order confirmation from a buyer system;
receiving, by the computer based system, a first invoice and a second invoice associated with the PO and the order confirmation from the supplier system;
reconciling, by the computer based system, between the PO, the first invoice, and the order confirmation, wherein the reconciliation comprises:
determining a matched line item set comprising a same set of line items across each of the first invoice, the second invoice, the PO, and the order confirmation based at least in part on a common attribute; and
determining a running total for the matched line item set based at least in part on an item price and an item quantity, wherein the running total for the matched line item set is determined across the first invoice and the second invoice based at least in part on adding a plurality of item invoice quantities for the first invoice and the second invoice and a purchase order item quantity;
generating, by the computer based system, a third invoice in response to the reconciling, wherein the third invoice is generated based at least in part on the running total for the matched line item set; and
passing, by the computer based system, the third invoice to the buyer system.

14. The article of manufacture of claim 13, further comprising:
consuming, by the computer based system, an order confirmation message and recording the order confirmation to an order confirmation table;
posting, by the computer based system, the order confirmation message to an order confirmation API of the buyer system and receiving a buyer order confirmation response message;
updating, by the computer based system, a status of the order confirmation based at least in part on the buyer order confirmation response message; and
resending, by the computer based system, the order confirmation message to the order confirmation API in response to an error.

15. The article of manufacture of claim 14, further comprising:
comparing, by the computer based system, the first invoice against a plurality of invoices in a first invoice table to determine a new invoice;
writing, by the computer based system, the first invoice to the first invoice table in response to determining the new invoice; and
fetching, by the computer based system, the PO and the order confirmation; and matching, by the computer based system, the first invoice, the PO, and the order confirmation.

16. The article of manufacture of claim 15, further comprising:
reading, by the computer based system, a plurality of line items from each of the first invoice, the PO, and the order confirmation.

17. The article of manufacture of claim 15, further comprising:
fetching, by the computer based system, the first invoice from the first invoice table; generating, by the computer based system, the second invoice based at least in part on the PO, the first invoice, and the running total;

passing, by the computer based system, the second invoice to an electronic invoicing API of the buyer system and receiving a reply; and updating, by the computer based system, a status of the second invoice recorded in a second invoice table based at least in part on the reply.

18. The article of manufacture of claim 17, further comprising:

generating, by the computer based system, a generate payment instruction file (PIF) message;

generating, by the computer based system, a PIF based at least in part on the first invoice and the PO in response to the generate PIF message;

passing, by the computer based system, the PIF to a payment API and receiving a payment confirmation ID in response; and associating, by the computer based system, at least one of the payment confirmation ID or the PIF with the second invoice.

19. The article of manufacture of claim 13, further comprising a kafka architecture.

20. The article of manufacture of claim 13, wherein the reconciliation comprises further comprises:

storing, by the computer based system, the running total for the matched line item set in a running total table; and publishing, by the computer based system, an electrical message to an invoice topic, wherein the invoice topic causes a generation of the third invoice.

\* \* \* \* \*